(12) United States Patent
Kataoka et al.

(10) Patent No.: US 11,472,254 B2
(45) Date of Patent: Oct. 18, 2022

(54) VEHICLE

(71) Applicant: TOYOTA JIDOSHA KABUSHIKI KAISHA, Aichi-ken (JP)

(72) Inventors: Tomoharu Kataoka, Yaizu (JP); Jumpei Watanabe, Nagakute (JP); Masashi Nose, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 105 days.

(21) Appl. No.: 17/031,918

(22) Filed: Sep. 25, 2020

(65) Prior Publication Data

US 2021/0229521 A1    Jul. 29, 2021

(30) Foreign Application Priority Data

Jan. 24, 2020  (JP) .............................. JP2020-010339

(51) Int. Cl.
  *B60H 1/32*   (2006.01)
  *B60H 1/00*   (2006.01)
  *B60L 58/26*  (2019.01)
  *B60N 2/00*   (2006.01)

(52) U.S. Cl.
  CPC ..... *B60H 1/00278* (2013.01); *B60H 1/00207* (2013.01); *B60H 1/00328* (2013.01); *B60H 1/00392* (2013.01); *B60H 1/00485* (2013.01); *B60H 1/00885* (2013.01); *B60L 58/26* (2019.02); *B60N 2/002* (2013.01); *B60H 2001/00221* (2013.01); *B60H 2001/00307* (2013.01)

(58) Field of Classification Search
  CPC ............ B60H 1/00278; B60H 1/00207; B60H 1/00328; B60H 1/00392; B60H 1/00485; B60H 1/00885; B60H 2001/00221; B60H 2001/00307; B60L 58/26; B60N 2/002
  USPC .......................................................... 62/239
  See application file for complete search history.

(56) References Cited

U.S. PATENT DOCUMENTS

| | | | |
|---|---|---|---|
| 2006/0231047 A1* | 10/2006 | Hiroshima | B60K 11/02 123/41.29 |
| 2014/0020968 A1 | 1/2014 | Ikeya | |
| 2015/0136504 A1* | 5/2015 | Tsujimura | B60L 53/11 180/68.5 |
| 2020/0346520 A1* | 11/2020 | Ishizeki | B60H 1/00921 |

FOREIGN PATENT DOCUMENTS

| | | |
|---|---|---|
| JP | 2012224144 A | 11/2012 |
| JP | 201918823 A | 2/2019 |
| JP | 2019186072 A | 10/2019 |

* cited by examiner

*Primary Examiner* — Davis D Hwu
(74) *Attorney, Agent, or Firm* — Hauptman Ham, LLP

(57) ABSTRACT

Provided is a vehicle including: a vehicle main body including an electrical device that generates heat when the vehicle travels; a heat exchanger that performs heat exchange between outside air and a refrigerant; and cooling piping that constitutes a flow passage through which the refrigerant circulates between the electrical device and the heat exchanger, with a part of the flow passage being routed on a lower surface side of and in contact with a floor panel that constitutes a part of the vehicle main body.

4 Claims, 7 Drawing Sheets

| SCENE | STATE INSIDE VEHICLE CABIN | COOLING OF BATTERY | UPPER COOLING PART | LOWER COOLING PART |
|---|---|---|---|---|
| 1 | HEATING NEEDED | NOT NEEDED | TURN OFF REFRIGERANT | TURN OFF REFRIGERANT |
| 2 | HEATING NEEDED | NEEDED | TURN OFF OR ON REFRIGERANT | TURN ON REFRIGERANT |
| 3 | COOLING NEEDED | NEEDED | TURN ON REFRIGERANT | TURN ON REFRIGERANT |
| 4 | HEATING NEEDED | NEEDED | TURN OFF OR ON REFRIGERANT | TURN ON REFRIGERANT |

VEHICLE

CROSS-REFERENCE TO RELATED APPLICATION

This application claims priority to Japanese Patent Application No. 2020-010339 filed on Jan. 24, 2020, incorporated herein by reference in its entirety.

BACKGROUND OF THE INVENTION

1. Field of the Invention

The invention relates to a vehicle.

2. Description of Related Art

Japanese Patent Application Publication No. 2019-018823 (JP 2019-018823 A) discloses an electric vehicle equipped with a driving battery under a floor panel.

SUMMARY OF THE INVENTION

When a vehicle is constructed to travel on electricity supplied to a motor, like the electric vehicle disclosed in JP 2019-018823 A, using electricity for other purposes than traveling results in a decrease in the range of the vehicle. This makes a vehicle desirable that has a structure including an electrical device, such as a battery, and can heat the inside of the vehicle cabin in a manner that consumes less electricity.

In view of the above fact, the invention aims to obtain a vehicle that has a structure including an electrical device, such as a battery, and can heat the inside of the vehicle cabin in a manner that consumes less electricity.

A vehicle according to claim 1 includes: a vehicle main body including an electrical device that generates heat when the vehicle travels; a heat exchanger that performs heat exchange between outside air and a refrigerant; and cooling piping that constitutes a flow passage through which the refrigerant circulates between the electrical device and the heat exchanger, with a part of the flow passage being routed on the lower surface side of and in contact with a floor panel that constitutes a part of the vehicle main body.

The vehicle main body of the vehicle according to claim 1 includes the electrical device that generates heat when the vehicle travels. The heat exchanger performs heat exchange with this electrical device through the refrigerant. Further, the vehicle has the cooling piping constituting the flow passage through which the refrigerant circulates between the electrical device and the heat exchanger. Thus, the electrical device is cooled as the refrigerant flowing through the cooling piping circulates between the electrical device and the heat exchanger.

A part of the flow passage of the cooling piping is routed on the lower surface side of and in contact with the floor panel. This allows heat of the refrigerant to transfer directly to the floor panel through the cooling piping to thereby heat the inside of the vehicle cabin.

A vehicle according to claim 2 is the vehicle according to claim 1, wherein the electrical device includes a driving battery provided on the lower surface side of the floor panel, and the cooling piping includes an upper cooling part that is routed in a state of being sandwiched between the driving battery and the floor panel.

In the vehicle according to claim 2, the electrical device includes the driving battery. The upper cooling part constituting a part of the cooling piping is routed in the state of being sandwiched between the driving battery and the floor panel. This allows heat generated by the driving battery to transfer directly to the floor panel though the refrigerant. Thus, heat that the refrigerant has taken away from the driving battery can be kept from being released outside the vehicle cabin.

A vehicle according to claim 3 is the vehicle according to claim 2, wherein the cooling piping includes a lower cooling part that is routed along a lower surface of the driving battery, and the cooling piping is provided with a switching valve capable of switching the flow passage between a state where the refrigerant flows to both the upper cooling part and the lower cooling part and a state where the refrigerant flows to only one of the upper cooling part and the lower cooling part.

In the vehicle according to claim 3, the cooling piping includes the upper cooling part that is routed in the state of being sandwiched between the driving battery and the floor panel, the lower cooling part that is routed along the lower surface of the driving battery, and the switching valve that switches the flow passage of the refrigerant. The switching valve is configured to be capable of switching the flow passage between a state where the refrigerant flows to both the upper cooling part and the lower cooling part and a state where the refrigerant flows to only one of the upper cooling part and the lower cooling part. Thus, for example, when heating of the inside of the vehicle cabin is prioritized, switching the flow passage to a state where the refrigerant flows to only the lower cooling part allows heat to transfer effectively to the floor panel. On the other hand, when heating of the inside of the vehicle cabin is not needed, switching the flow passage to a state where the refrigerant flows to both the upper cooling part and the lower cooling part allows less heat of the driving battery to transfer to the floor panel.

A vehicle according to claim 4 is the vehicle according to claim 3, wherein the switching valve is configured to be capable of switching the flow passage to a state where the refrigerant flows to neither of the upper cooling part and the lower cooling part.

In the vehicle according to claim 4, the switching valve switches the flow passage to a state where the refrigerant flows to neither of the upper cooling part and the lower cooling part. Thus, the temperature of the refrigerant inside the upper cooling part and the lower cooling part rises, so that a larger amount of heat can be transferred to the floor panel.

A vehicle according to claim 5 is the vehicle according to any one of claims 1 to 4 and further includes: a vehicle seat provided inside a vehicle cabin; a seat occupancy sensor that detects that a passenger sits in the vehicle seat; and an on-off valve provided on the cooling piping and controlled by a control unit. The cooling piping is routed at least under the vehicle seat, and the control unit opens or closes the on-off valve to stop a flow of a refrigerant flowing through a part of the cooling piping that is located under the vehicle seat in which the seat occupancy sensor has detected that a passenger is sitting.

In the vehicle according to claim 5, the vehicle seat is provided inside the vehicle cabin, and the cooling piping is routed at least under the vehicle seat. The vehicle includes the seat occupancy sensor that detects that a passenger sits in the vehicle seat, and the on-off valve. The control unit stops the flow of the refrigerant flowing through a part of the cooling piping that is routed under the vehicle seat in which the seat occupancy sensor has detected that a passenger is sitting. This allows heat that the refrigerant has taken away from the driving battery to transfer effectively to the vehicle seat.

As has been described above, the vehicle according to claim 1 has a structure including an electrical device, such as a battery, and can heat the inside of the vehicle cabin in a manner that consumes less electricity.

The vehicle according to claim 2 can effectively use the heat generated by the driving battery.

The vehicle according to claim 3 can avoid unnecessarily heating the inside of the vehicle cabin.

The vehicle according to claim 4 can more efficiently heat the inside of the vehicle cabin.

The vehicle according to claim 5 can enhance the comfort of a passenger sitting in the vehicle seat.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle 10 according to an embodiment will be described with reference to the drawings. Arrows FR, UP, and RH shown as necessary in the drawings indicate directions toward a front side, an upper side, and a right side, respectively, of the vehicle. Unless otherwise noted, frontward, rearward, upward, downward, leftward, and rightward directions used alone in the following description mean frontward and rearward in a vehicle front-rear direction, upward and downward in a vehicle height direction, and leftward and rightward as seen from a vehicle frontward direction, respectively. For the convenience of illustration, some of the drawings are depicted in an exaggerated scale.

Overall Configuration

Figure 1:
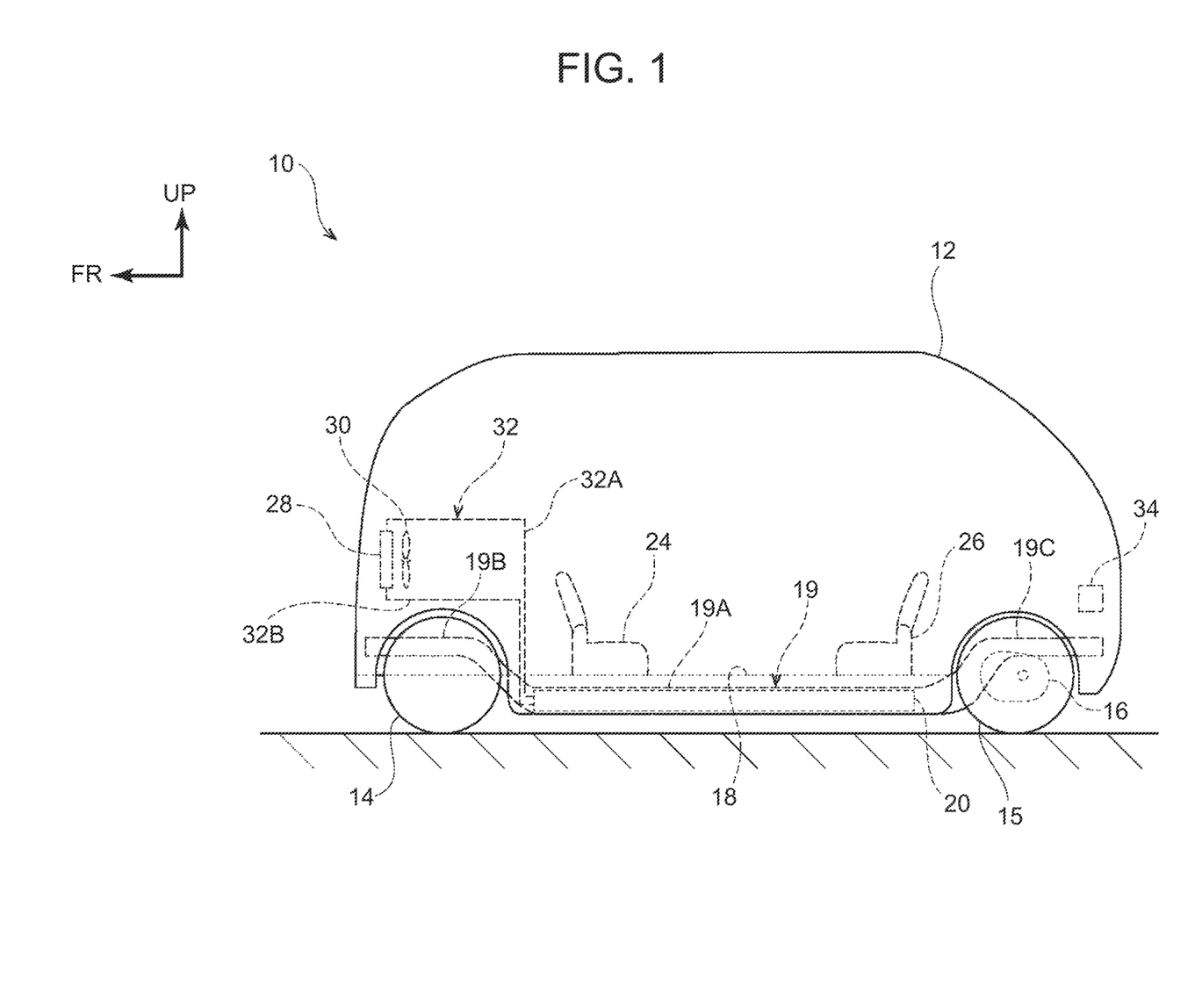
FIG. 1 is a schematic side view showing main parts of a vehicle according to an embodiment.

As shown in FIG. 1, the vehicle 10 of the embodiment includes a vehicle main body 12. A pair of left and right front wheels 14 is provided at a front end portion of the vehicle main body 12, and a pair of left and right rear wheels 15 is provided at a rear end portion of the vehicle main body 12. A driving unit 16 is provided at a rear end portion of the vehicle main body 12. The driving unit 16 includes a traction motor, and drives the rear wheels 15 that are driving wheels by rotating the traction motor with electricity supplied from a driving battery 20 to be described later.

A pair of side members 19 extending in the vehicle front-rear direction is provided at a lower portion of the vehicle main body 12. In FIG. 1, only the side member 19 on a left side of the vehicle is shown. Each side member 19 has a center side member 19A extending from the front wheel 14 to the rear wheel 15. A front side member 19B is provided at a front end portion of the center side member 19A, and the front side member 19B bends toward an inner side in the vehicle width direction as well as a vehicle upper side and then extends toward a vehicle front side. A rear side member 19C is provided at a rear end portion of the center side member 19A, and the rear side member 19C bends toward the inner side in the vehicle width direction as well as the vehicle upper side and then extends toward a vehicle rear side.

Here, the driving battery 20 as an electrical device that generates heat when the vehicle 10 travels is provided between the pair of left and right center side members 19A. The driving battery 20 is provided on a lower surface side of a floor panel 18 and fastened to the center side members 19A. The driving battery 20 is provided at a central portion of the vehicle main body 12 in the vehicle front-rear direction and electrically connected to the driving unit 16 (not shown) that drives the vehicle 10. As electricity is supplied from the driving battery 20 to the driving unit 16, the traction motor is driven to cause the vehicle 10 to travel. A configuration in which one traction motor is provided on one side in the vehicle front-rear direction may be adopted. Alternatively, a configuration in which an in-wheel motor is provided in each wheel 14 may be adopted.

The driving battery 20 is connected to a power control unit (not shown; hereinafter referred to as a "PCU" where appropriate), and the traction motor (not shown) is connected to the PCU. The PCU includes an inverter capable of converting alternating-current power into direct-current power and direct-current power into alternating-current power, and is configured such that electricity is supplied from the driving battery 20 to the traction motor via the PCU. The driving battery 20 will be described in detail later.

A vehicle seat 24 and a vehicle seat 26 are provided on an upper surface side of the floor panel 18. The vehicle seat 24 and the vehicle seat 26 of the embodiment are disposed, for example, so as to face each other inside the vehicle cabin and configured to allow passengers to sit face-to-face with each other.

Figure 4:
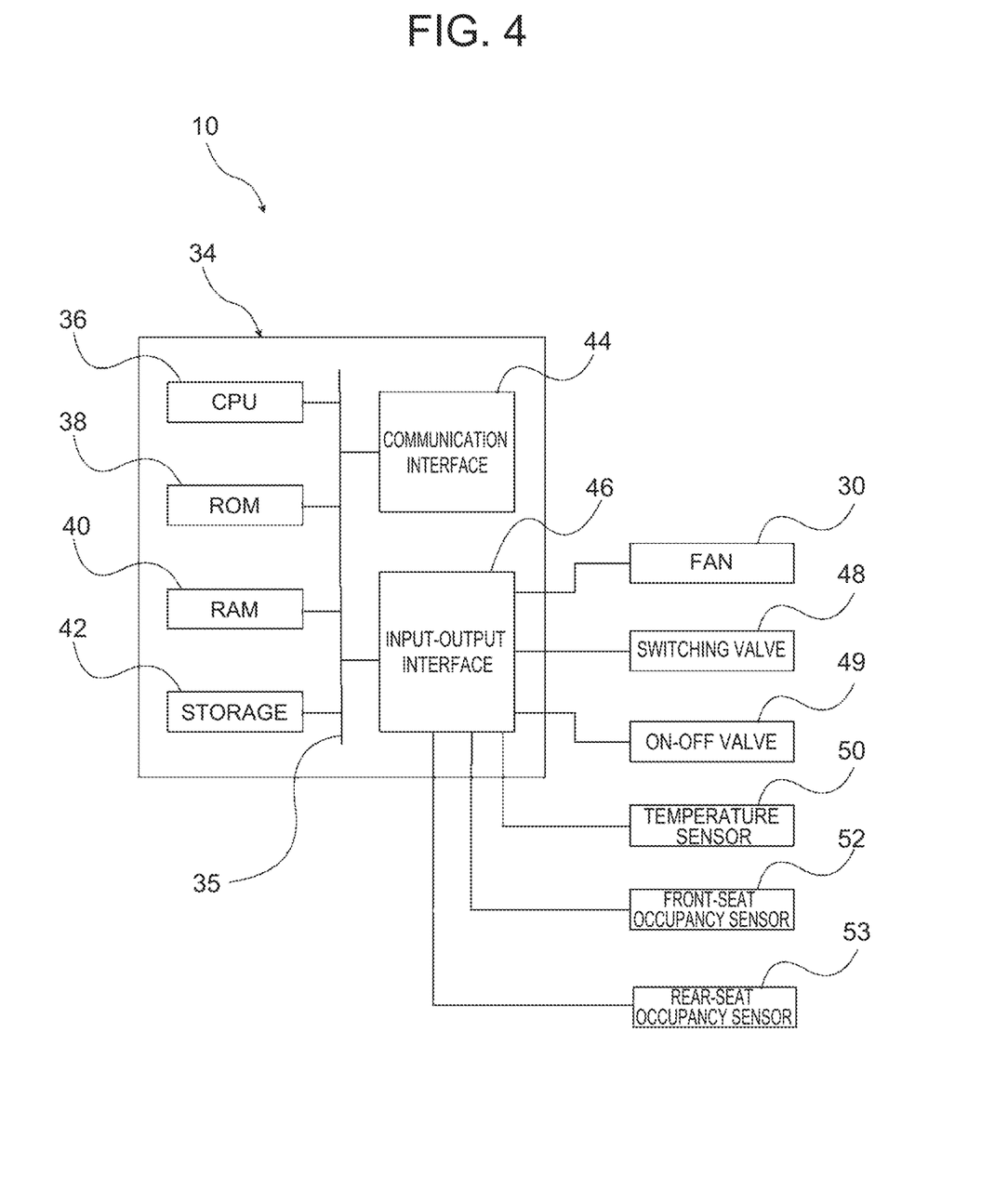
FIG. 4 is a block diagram showing the hardware configuration of the vehicle according to the embodiment.

The vehicle seat 24 is provided with a front-seat occupancy sensor 52 that detects that a passenger sits in the vehicle seat 24, and the vehicle seat 26 is provided with a rear-seat occupancy sensor 53 that detects that a passenger sits in the vehicle seat 26 (see FIG. 4). The front-seat occupancy sensor 52 and the rear-seat occupancy sensor 53 are formed by pressure sensors or the like incorporated inside a seat cushion.

Here, a radiator 28 as a heat exchanger that performs heat exchange between outside air and a refrigerant is provided at a vehicle front-side end portion of the vehicle main body 12, and a fan 30 is provided behind the radiator 28. Further, an electronic control unit (ECU) 34 as a control unit that controls the fan 30 is provided in the vehicle main body 12.

The radiator 28 is provided behind an opening (not shown) formed at a front end portion of the vehicle main body 12, and is configured such that when the vehicle main body 12 travels, air ahead of the vehicle main body 12 is introduced into the radiator 28 through this opening. Similarly, outside air is introduced from an outside of the vehicle main body 12 into the radiator 28 through the opening also when the fan 30 is activated.

The radiator 28 and the driving battery 20 are coupled together by cooling piping 32 through which a refrigerant circulates. Specifically, the cooling piping 32 includes cooling piping 32A for heat radiation through which a refrigerant having passed through an inside of the driving battery 20 flows into the radiator 28, and cooling piping 32B for cooling through which the refrigerant having passed through the radiator 28 flows into the driving battery 20. A flow passage through which the refrigerant circulates between the driving battery 20 and the radiator 28 is formed by the cooling piping 32. In this embodiment, a coolant is used as the refrigerant.

The cooling piping 32 is provided with a pump (not shown). The ECU 34 executes control such that the refrigerant circulates through the cooling piping 32 when the driving battery 20 needs cooling. As the refrigerant thus circulates between the driving battery 20 and the radiator 28, the refrigerant having been cooled to a low temperature by undergoing heat exchange with outside air in the radiator 28 flows along the driving battery 20. As a result, the driving battery 20 that is an electrical device is cooled.

Configuration of Cooling Piping 32

Figure 2:
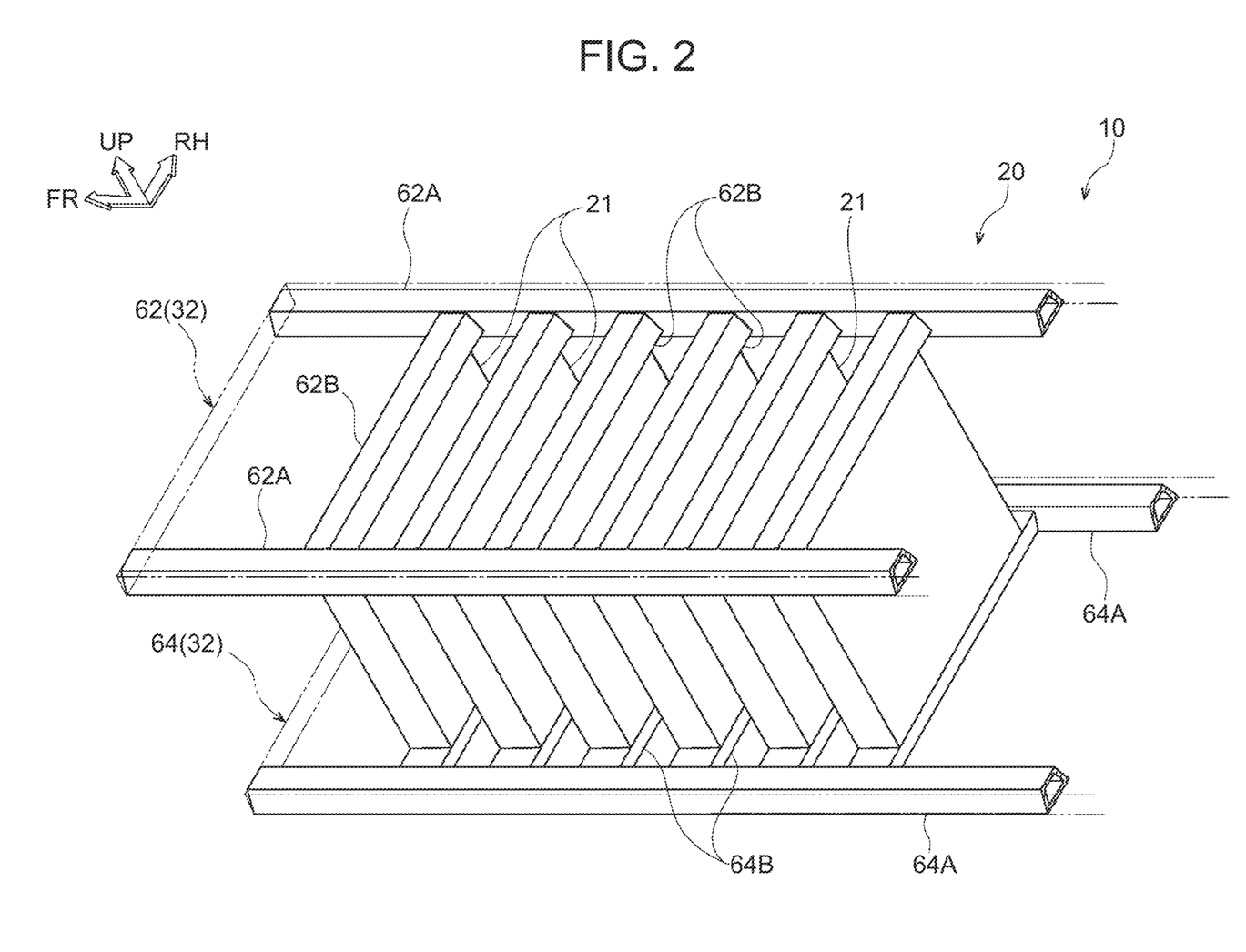
FIG. 2 is an enlarged perspective view schematically showing a close-up of a part of a driving battery in the embodiment.

As shown in FIG. 2, the cooling piping 32 includes an upper cooling part 62 and a lower cooling part 64, and the driving battery 20 is sandwiched by the upper cooling part 62 and the lower cooling part 64 from the upper and lower sides.

The driving battery 20 includes a plurality of battery modules 21 that is arrayed in the vehicle front-rear direction. Each battery module 21 is formed by stacking a plurality of battery cells (not shown).

The upper cooling part 62 includes a pair of left and right upper front-rear flow passages 62A and a plurality of upper coupling flow passages 62B. The pair of left and right upper front-rear flow passages 62A is disposed at upper portions of the driving battery 20, one on each side of the driving battery 20 in the vehicle width direction, and extends in the vehicle front-rear direction along the array direction of the battery modules 21. A cross-sections of each upper front-rear flow passage 62A as seen from the vehicle front-rear direction has a substantially trapezoidal shape with an upper portion forming the short side, and a flow passage for the refrigerant to flow through is formed inside each upper front-rear flow passage 62A.

The upper coupling flow passages 62B extend in the vehicle width direction and couple together the upper front-rear flow passages 62A in the vehicle width direction. A cross-section of each upper coupling flow passage 62B as seen from the vehicle width direction has a substantially trapezoidal shape with an upper portion forming the short side, and a flow passage for the refrigerant to flow through is formed inside each upper coupling flow passage 62B. The upper front-rear flow passages 62A are disposed in the vehicle front-rear direction at an interval substantially equal to the width of the battery modules 21 and in contact with upper end surfaces of the battery modules 21. An internal space of each upper coupling flow passage 62B communicates with an internal space of each upper front-rear flow passage 62A. This configuration allows the refrigerant to flow from the upper front-rear flow passage 62A to the upper coupling flow passage 62B and vice versa.

Figure 3:
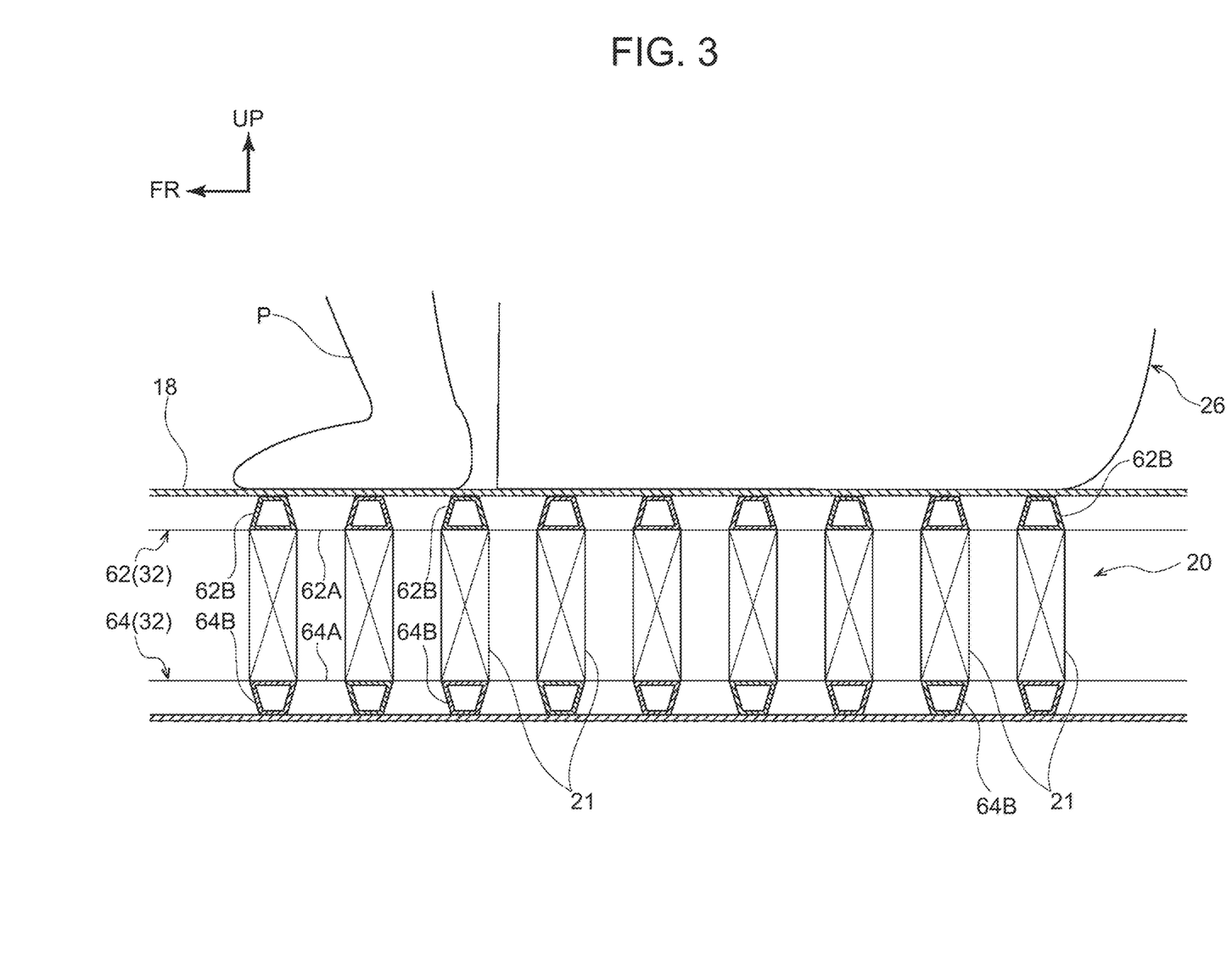
FIG. 3 is a sectional view of a part of the driving battery in the embodiment as seen from a vehicle width direction.

Here, as shown in FIG. 3, the upper front-rear flow passages 62A and the upper coupling flow passages 62B forming the upper cooling part 62 are in contact with a lower surface of the floor panel 18. Thus, the upper coupling flow passages 62B are routed in a state of being sandwiched between the floor panel 18 and the battery modules 21 (driving battery 20).

As shown in FIG. 2, the lower cooling part 64 includes a pair of left and right lower front-rear flow passages 64A and a plurality of lower coupling flow passages 64B. The pair of left and right lower front-rear flow passages 64A is disposed at lower portions of the driving battery 20, one on each side of the driving battery 20 in the vehicle width direction, and extends in the vehicle front-rear direction along the array direction of the battery modules 21. A cross-section of each lower front-rear flow passage 64A as seen from the vehicle front-rear direction has a substantially trapezoidal shape with an upper portion forming the short side, and a flow passage for the refrigerant to flow through is formed inside each lower front-rear flow passage 64A.

The lower coupling flow passages 64B extend in the vehicle width direction and couple together the lower front-rear flow passages 64A in the vehicle width direction. A cross-section of each lower coupling flow passage 64B as seen from the vehicle width direction has a substantially trapezoidal shape with a lower portion forming the short side, and a flow passage for the refrigerant to flow through is formed inside each lower coupling flow passage 64B. Here, the lower front-rear flow passages 64A are disposed in the vehicle front-rear direction at an interval substantially equal to the width of the battery modules 21 and in contact with lower end surfaces of the battery modules 21. An internal space of each lower coupling flow passage 64B communicates with an internal space of each lower front-rear flow passage 64A. This configuration allows the refrigerant to flow from the lower front-rear flow passage 64A to the lower coupling flow passage 64B and vice versa.

Since the upper cooling part 62 and the lower cooling part 64 are configured as described above, each battery module 21 is in a state of being sandwiched by the upper coupling flow passages 62B and the lower coupling flow passages 64B from the upper and lower sides. A switching valve 48 (see FIG. 4) is provided at a junction between the upper cooling part 62 and the lower cooling part 64, and switching the switching valve 48 can switch the flow passage between a state where the refrigerant flows to both the upper cooling part 62 and the lower cooling part 64 and a state where the refrigerant flows to only one of the upper cooling part 62 and the lower cooling part 64. Further, the switching valve 48 can switch the flow passage to a state where the refrigerant flows to neither of the upper cooling part 62 and the lower cooling part 64.

The upper cooling part 62 is provided with a plurality of on-off valves 49 (see FIG. 4). Although this is not shown, the on-off valves 49 are provided in this embodiment, for example, at junctions between the upper front-rear flow passages 62A and the upper coupling flow passages 62B, at predetermined intervals in the vehicle front-rear direction. Opening and closing the on-off valves 49 can cause the refrigerant to flow to only an arbitrary portion of the upper cooling part 62. The switching valve 48 and the on-off valves 49 are electrically connected to the ECU 34 and opened and closed by receiving signals from the ECU 34.

Hardware Configuration

As shown in FIG. 4, the ECU 34 constituting a part of the vehicle 10 includes a central processing unit (CPU; processor) 36, a read-only memory (ROM) 38, a random-access memory (RAM) 40, a storage 42, a communication interface 44, and an input-output interface 46. These components are connected to one another through a bus 35 so as to be able to communicate with one another.

The CPU 36 is a central arithmetic processing unit, and executes various programs and controls relevant parts. The CPU 36 reads a program from the ROM 38 or the storage 42 and executes the program using the RAM 40 as a workspace. The CPU 36 controls the above-described components and performs various arithmetic processes in accordance with a program stored in the ROM 38 or the storage 42.

The ROM 38 stores various programs and various pieces of data. The RAM 40 temporarily stores a program or data as a workspace. The storage 42 is formed by a hard disk drive (HDD) or a solid-state drive (SSD), and stores various programs including an operating system, and various pieces of data.

The communication interface 44 is an interface through which the vehicle main body 12 communicates with external devices, and uses a standard such as Ethernet®, FDDI, or Wi-Fi®.

The input-output interface 46 is electrically connected to the fan 30, the switching valve 48, the on-off valves 49, a temperature sensor 50, the front-seat occupancy sensor 52, and the rear-seat occupancy sensor 53. The fan 30 is activated to rotate and thereby introduce outside air into the radiator 28. The switching valve 48 is formed by, for example, a three-way valve. There is a plurality of on-off valves 49 provided on the cooling piping 32, and these on-off valves 49 are configured to be opened and closed independently of one another. For the convenience of illustration, FIG. 4 shows only one on-off valve 49. The temperature sensor 50 is provided in the vicinity of the driving battery 20, and detects the temperature of the driving battery 20 and sends the detected temperature to the ECU 34.

Functional Configuration

The vehicle 10 realizes various functions using the hardware resources shown in FIG. 4. Functional components realized by the vehicle 10 will be described with reference to FIG. 5.

Figure 5:
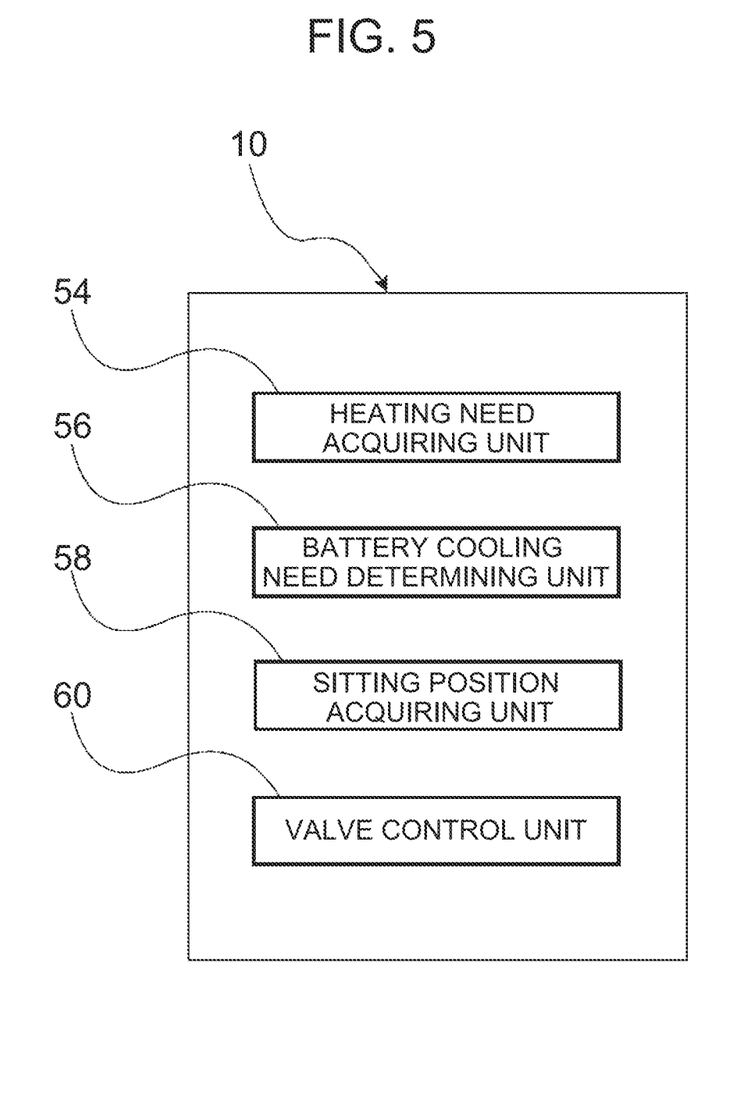
FIG. 5 is a block diagram showing the functional configuration of the vehicle according to the embodiment.

As shown in FIG. 5, the vehicle 10 includes, as functional components, a heating need acquiring unit 54, a battery cooling need determining unit 56, a sitting position acquiring unit 58, and a valve control unit 60. Each functional component is realized by the CPU 36 reading a program stored in the storage 42 and executing this program.

The heating need acquiring unit 54 acquires information on the need for heating the inside of the vehicle cabin. For example, the heating need acquiring unit 54 acquires an instruction to raise the temperature of the inside of the vehicle cabin that is given by a passenger through an operation. The heating need acquiring unit 54 may infer the need for heating by acquiring he temperature of the inside of the vehicle cabin.

The battery cooling need determining unit 56 determines whether or not the driving battery 20 needs cooling. Specifically, when information from the temperature sensor 50 (see FIG. 4) shows that the temperature of the driving battery 20 is higher than an upper limit of a predetermined optimal temperature, the battery cooling need determining unit 56 determines that the driving battery 20 needs cooling. When the temperature of the driving battery 20 is lower than a lower limit of the optimal temperature, the battery cooling need determining unit 56 may determine that the driving battery 20 does not need cooling.

Of the vehicle seats 24, 26 provided inside the vehicle cabin, the sitting position acquiring unit 58 acquires the position of a vehicle seat in which a passenger is sitting. Specifically, when the sitting position acquiring unit 58 detects that a passenger is sitting in the vehicle seat 24 based on signals from the front-seat occupancy sensor 52 and the rear-seat occupancy sensor 53, the sitting position acquiring unit 58 acquires the position where the vehicle seat 24 is provided as the position where the passenger is sitting. When the sitting position acquiring unit 58 detects that a passenger is sitting in the vehicle seat 26, the sitting position acquiring unit 58 acquires the position where the vehicle seat 26 is provided as the position where the passenger is sitting.

The valve control unit 60 controls the switching valve 48 and the on-off valves 49. Specifically, in an initial state, the valve control unit 60 opens the switching valve 48 and all the on-off valves 49. Thus, the refrigerant heading from the radiator 28 toward the driving battery 20 flows through all regions of the upper cooling part 62 and the lower cooling part 64 along the driving battery 20.

Figure 7:
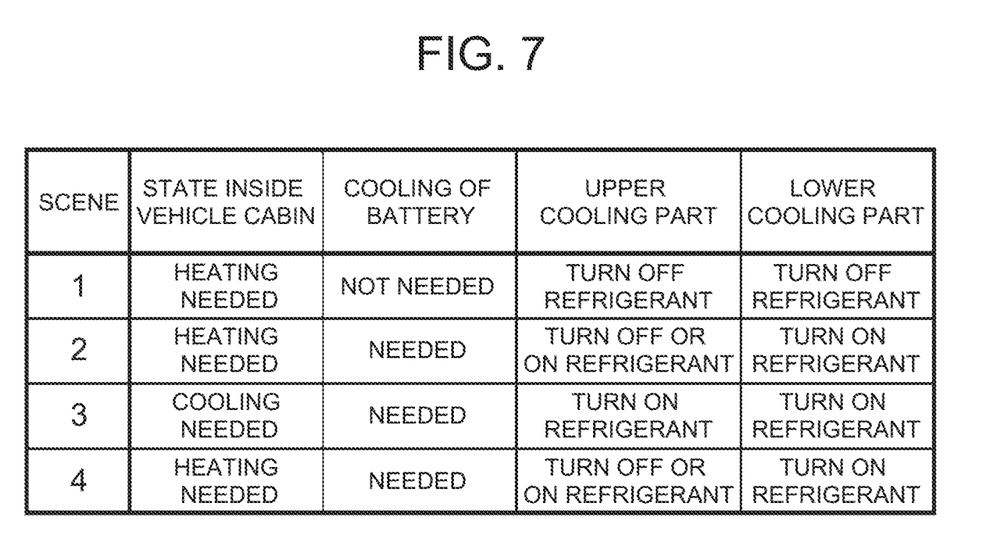
FIG. 7 is a chart showing conditions for turning on a refrigerant in the embodiment.

The valve control unit 60 controls the switching valve 48 based on the conditions for turning on the refrigerant shown in FIG. 7. In the following, scenes set as the conditions for turning on the refrigerant will be described.

As shown in FIG. 7, in Scene 1, the heating need acquiring unit 54 acquires a need for heating the inside of the vehicle cabin, and the battery cooling need determining unit 56 determines that the driving battery 20 does not need cooling. Examples of such a scene include a case where the outside air temperature is low while the vehicle is traveling in an urban area. In this case, the flow of the refrigerant to both the upper cooling part 62 and the lower cooling part 64 is stopped. In other words, the refrigerant to both the upper cooling part 62 and the lower cooling part 64 is turned off. Specifically, the valve control unit 60 controls the switching valve 48 so as to switch the flow passage to a state where the refrigerant flows to neither of the upper cooling part 62 and the lower cooling part 64. Thus, in the upper cooling part 62, heat is transferred to the floor panel 18 from the refrigerant that has taken heat away from the driving battery 20. Since the refrigerant to the lower cooling part 64 is also turned off, unnecessary cooling of the driving battery 20 can be avoided.

In Scene 2, the heating need acquiring unit 54 acquires a need for heating the inside of the vehicle cabin, and the battery cooling need determining unit 56 determines that the driving battery 20 needs cooling. Examples of such a scene include a case where the outside air temperature is low while the vehicle is traveling on an expressway. In this case, the refrigerant to the lower cooling part 64 is turned on. Specifically, the valve control unit 60 controls the switching valve 48 so as to switch the flow passage to a state where the refrigerant flows to the lower cooling part 64. Thus, the driving battery 20 can be cooled. Under predetermined conditions, the valve control unit 60 switches the flow passage to a state where the refrigerant flows also to the upper cooling part 62. For example, the valve control unit 60 causes the refrigerant to flow also to the upper cooling part 62 when the driving battery 20 is not sufficiently cooled. When the driving battery 20 can be cooled by causing the refrigerant to flow to only the lower cooling part 64, the valve control unit 60 turns off the refrigerant to the upper cooling part 62 to thereby transfer heat to the floor panel 18.

Further, in Scene 3, the heating need acquiring unit 54 does not acquire a need for heating the inside of the vehicle cabin and instead cooling of the inside of the vehicle cabin is needed, and the battery cooling need determining unit 56 determines that the driving battery 20 needs cooling. Examples of such a scene include a case where the outside air temperature is high while the vehicle is traveling on an expressway, and a case where fast charging is performed in summer. In these cases, the refrigerant to the upper cooling part 62 and the lower cooling part 64 is turned on. Specifically, the valve control unit 60 controls the switching valve 48 so as to switch the flow passage to a state where the refrigerant flows to both the upper cooling part 62 and the lower cooling part 64. Thus, unnecessary warming of the floor panel 18 can be avoided. In addition, the driving battery 20 can be efficiently cooled.

Next, in Scene 4, the heating need acquiring unit 54 acquires a need for heating the inside of the vehicle cabin, and the battery cooling need determining unit 56 determines that the driving battery 20 needs cooling. Examples of such a scene include a case where fast charging is performed in winter. In this case, the refrigerant to the lower cooling part 64 is turned on. Specifically, the valve control unit 60 controls the switching valve 48 so as to switch the flow passage to a state where the refrigerant flows to the lower cooling part 64. Thus, the driving battery 20 can be cooled. Under predetermined conditions, the valve control unit 60 switches the flow passage to a state where the refrigerant flows also to the upper cooling part 62. For example, the valve control unit 60 causes the refrigerant to flow also to the upper cooling part 62 when the driving battery 20 is not sufficiently cooled. When the driving battery 20 can be cooled by causing the refrigerant to flow to only the lower cooling part 64, the valve control unit 60 turns off the refrigerant to the upper cooling part 62 to thereby transfer heat to the floor panel 18.

Of the vehicle seats 24, 26, the valve control unit 60 of the embodiment warms a vehicle seat in which a passenger is sitting by opening and closing the on-off valves 49. In the following, one example of the flow of a seat heating process for warming the vehicle seat 24 will be described with reference to the flowchart of FIG. 6. This process is performed by the CPU 36 reading a program from the ROM 38 or the storage 42 and expanding and executing the program in the RAM 40.

Seat Heating Process

Figure 6:
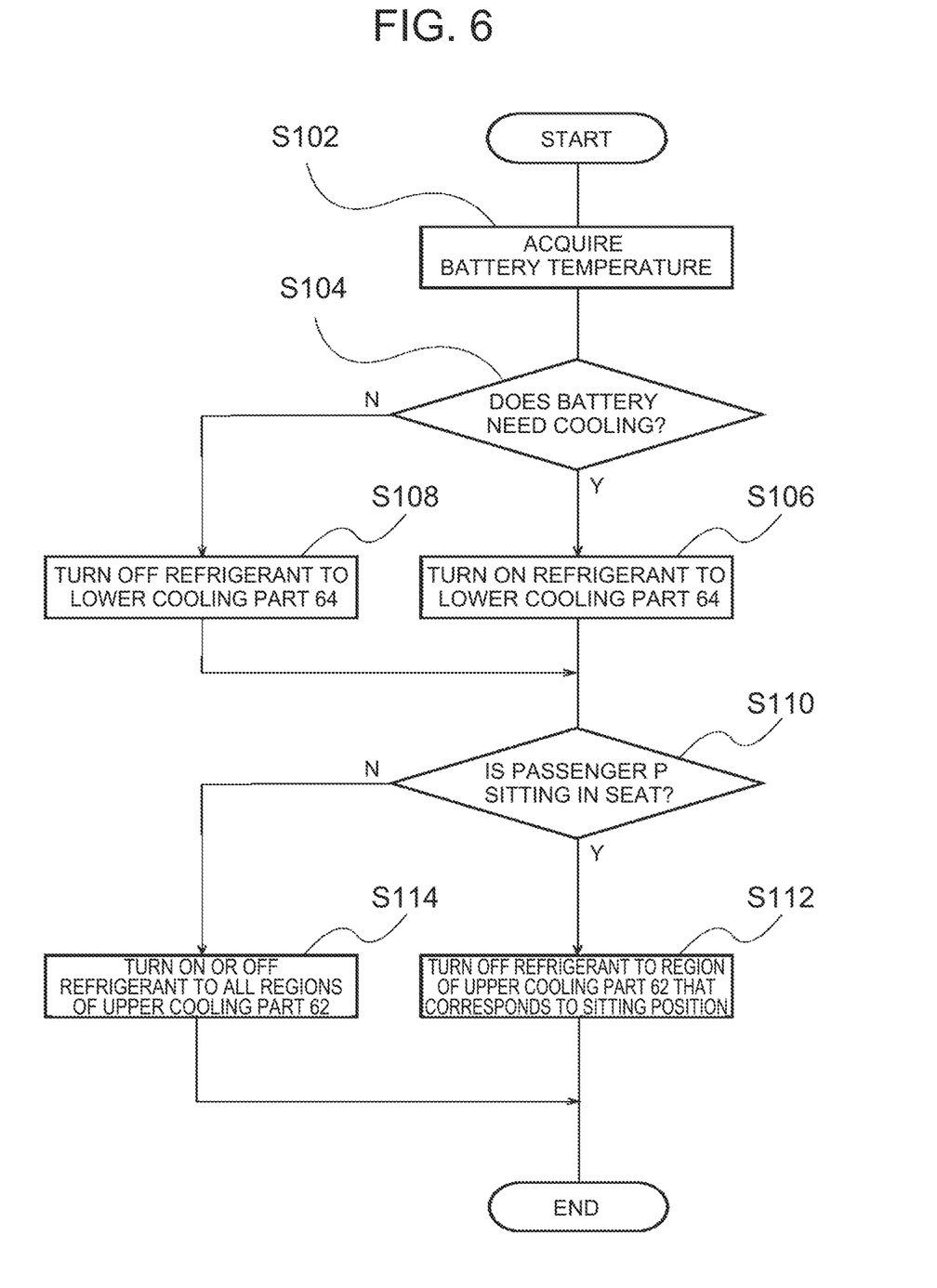
FIG. 6 is a flowchart showing one example of the flow of a seat heating process in the embodiment.

As shown in FIG. 6, in step S102, the CPU 36 acquires the temperature of the driving battery 20. Specifically, the CPU 36 acquires the temperature of the driving battery 20 detected by the temperature sensor 50.

Next, in step S104, the CPU 36 determines whether or not the driving battery 20 needs cooling. Specifically, the CPU 36 determines whether or not the driving battery 20 needs cooling by the function of the battery cooling need determining unit 56. When it is determined in step S104 that the driving battery 20 needs cooling, the CPU 36 moves to the process of step S106.

In step S106, the CPU 36 turns on the refrigerant to the lower cooling part 64. Specifically, the CPU 36 controls the switching valve 48 by the function of the valve control unit 60 so as to switch the flow passage to a state where the refrigerant flows to at least the lower cooling part 64. Then, the CPU 36 moves to the process of step S110.

On the other hand, when it is determined in step S104 that the driving battery 20 does not need cooling, i.e., that the driving battery 20 does not need to be cooled, the CPU 36 moves to the process of step S108. In step S108, the CPU 36 turns off the refrigerant to the lower cooling part 64. Specifically, the CPU 36 controls the switching valve 48 by the function of the valve control unit 60 so as to switch the flow passage to a state where the refrigerant does not flow to at least the lower cooling part 64. Then, the CPU 36 moves to the process of step S110.

In step S110, the CPU 36 determines whether or not passengers P are sitting in the vehicle seat 24 and the vehicle seat 26. Here, as one example, a state where a passenger P is sitting in the vehicle seat 26 as shown in FIG. 3 will be described. It is assumed that no passenger is sitting in the vehicle seat 24. In step S110, the CPU 36 determines that no passenger is sitting in the vehicle seat 24 based on a signal from the front-seat occupancy sensor 52 by the function of the sitting position acquiring unit 58. Similarly, the CPU 36 determines that a passenger P is sitting in the vehicle seat 26 based on a signal from the rear-seat occupancy sensor 53 by the function of the sitting position acquiring unit 58.

When it is determined in step S110 that a passenger P is sitting in at least one of the vehicle seat 24 and the vehicle seat 26, the CPU 36 moves to the process in step S112. When it is determined in step S110 that no passenger P is sitting in either of the vehicle seat 24 and the vehicle seat 26, the CPU 36 moves to the process of step S114.

In step S112, the CPU 36 turns off the refrigerant to a region of the upper cooling part 62 that corresponds to the sitting position of the passenger. Specifically, the CPU 36 controls the on-off valves 49 by the function of the valve control unit 60 so as to turn off the refrigerant to the region of the upper cooling part 62 that is located under the vehicle seat 26. Meanwhile, the refrigerant to other regions of the upper cooling part 62 is turned on or off according to the circumstances. For example, when the driving battery 20 needs cooling, the refrigerant to the upper cooling part 62 except for the region located under the vehicle seat 26 is turned on. Then, the CPU 36 ends the seat heating process.

On the other hand, in step S114, the CPU 36 turns on or off the refrigerant to all regions of the upper cooling part 62. Specifically, the CPU 36 controls the switching valve 48 by the function of the valve control unit 60 so as to turn on or off the refrigerant to the upper cooling part 62. For example, when the driving battery 20 needs cooling, the CPU 36 turns on the refrigerant to the upper cooling part 62. When heating of the inside of the vehicle cabin is prioritized, the CPU 36 turns off the refrigerant to the upper cooling part 62. Then, the CPU 36 ends the seat heating process. In this way, in the seat heating process of the embodiment, the on-off valves 49 are opened and closed to stop the flow of the refrigerant flowing through a part of the cooling piping 32 that is located under the vehicle seat 26 in which the rear-seat occupancy sensor 53 has detected that a passenger is sitting.

Workings

Next, the workings of the embodiment will be described.

In the vehicle 10 of the embodiment, the driving battery 20 is cooled as the refrigerant flowing through the cooling piping 32 circulates between the driving battery 20 that is an electrical device and the radiator 28 that is a heat exchanger, as shown in FIG. 1.

As shown in FIG. 3, a part of the flow passage of the cooling piping 32 is routed on the lower surface side of and in contact with the floor panel 18. This allows heat of the refrigerant to transfer directly to the floor panel 18 through the cooling piping 32 to thereby heat the inside of the vehicle cabin. As a result, part of heat generated by the driving battery 20 can be used for heating, so that the inside of the vehicle cabin can be heated in a manner that consumes less electricity.

In the embodiment, the upper cooling part 62 constituting a part of the cooling piping 32 is routed in a state of being sandwiched between the driving battery 20 and the floor panel 18. This allows heat generated by the driving battery 20 to transfer directly to the floor panel 18 through the refrigerant. Thus, heat that the refrigerant has taken away from the driving battery 20 can be kept from being released outside the vehicle cabin. As a result, this configuration can heat the inside of the vehicle cabin more efficiently than a configuration in which the upper cooling part 62 is located apart from the driving battery 20.

In the embodiment, the switching valve 48 is configured to be capable of switching the flow passage between a state where the refrigerant flows to both the upper cooling part 62 and the lower cooling part 64 and a state where the refrigerant flows to only one of the upper cooling part 62 and the lower cooling part 64. Thus, for example, when heating of the inside of the vehicle cabin is prioritized, switching the flow passage to a state where the refrigerant flows to only the upper cooling part 62 allows heat to transfer effectively to the floor panel 18. On the other hand, when heating of the inside of the vehicle cabin is not needed, switching the flow passage to a state where the refrigerant flows to both the upper cooling part 62 and the lower cooling part 64 can keep heat from transferring to the floor panel 18. In this way, unnecessary heating of the inside of the vehicle cabin can be avoided.

Moreover, in the embodiment, the switching valve 48 is configured to be capable of switching the flow passage to a state where the refrigerant flows to neither of the upper cooling part 62 and the lower cooling part 64. Thus, the temperature of the refrigerant inside the upper cooling part 62 and the lower cooling part 64 rises, so that a larger amount of heat can be transferred to the floor panel 18. As a result, this configuration can heat the inside of the vehicle cabin more efficiently than a configuration in which the refrigerant to only one of the upper cooling part 62 and the lower cooling part 64 is turned off.

The embodiment involves stopping the flow of the refrigerant flowing through a part of the cooling piping 32 that is routed under the vehicle seat 24 or 26 in which the front-seat occupancy sensor 52 or the rear-seat occupancy sensor 53 has detected that a passenger is sitting. This allows heat that the refrigerant has taken away from the driving battery 20 to transfer effectively to the vehicle seat 24 or 26. As a result, the comfort of the passenger sitting in the vehicle seat 24 or 26 can be enhanced.

While the vehicle 10 according to the embodiment has been described above, it should be understood that the invention can be implemented in various forms within the scope of the gist of the invention. For example, in the above embodiment, the electrical device to be cooled is the driving battery 20, but the electrical device is not limited thereto. The electrical device may instead be, for example, a motor (not shown). Alternatively, the electrical device may be a power control unit (PCU) that controls the output of the driving battery 20. Further, the electrical device may be an ECU or the like that is used for control during automated driving. Unlike the driving battery 20, the PCU and the ECU need to be constantly cooled during travel, and therefore the exhaust heat can be efficiently used to warm the inside of the vehicle cabin.

In the above embodiment, as shown in FIG. 2, the upper cooling part 62 is formed in a substantially ladder shape by the upper front-rear flow passages 62A and the upper coupling flow passages 62B, but the shape of the upper cooling part 62 is not limited thereto and may be other shape. For example, the upper coupling flow passage may be formed by routing the cooling piping 32 in a meandering manner so as to be in contact with the upper end surfaces of the battery modules 21.

In the above embodiment, the lower cooling part 64 is provided on the lower side of the driving battery 20, but the arrangement of the lower cooling part 64 is not limited thereto. The lower cooling part 64 may be provided, for example, along a side portion of the driving battery 20. Alternatively, the lower cooling part 64 may be provided between adjacent ones of the battery modules 21.

In the above embodiment, the radiator 28 is used as the heat exchanger, but the heat exchanger is not limited thereto. Any other heat exchanger that can perform heat exchange with a refrigerant may be used.

In the above embodiment, the configuration in which the vehicle seat 24 and the vehicle seat 26 are provided inside the vehicle cabin has been described, but the configuration is not limited thereto. The invention may also be applied to a configuration in which, for example, three or more vehicle seats are provided. In this case, each vehicle seat may be provided with a seat occupancy sensor. Alternatively, a camera that takes images of the inside of the vehicle cabin may be used as a seat occupancy sensor. In this case, a single camera can detect whether or not a passenger is sitting for all the vehicle seats.

The vehicle 10 of the above embodiment is an electrical vehicle having a motor as a driving source, but the vehicle 10 is not limited thereto. The invention may also be applied to, for example, a hybrid vehicle that has an engine and a motor as driving sources.

What is claimed is:

1. A vehicle, comprising:
    a vehicle main body including an electrical device that generates heat when the vehicle travels;
    a heat exchanger that performs heat exchange between outside air and a refrigerant; and
    cooling piping that constitutes a flow passage through which the refrigerant circulates between the electrical device and the heat exchanger, with a part of the flow passage being routed on a lower surface side of and in contact with a floor panel that constitutes a part of the vehicle main body, wherein
    the electrical device includes a driving battery provided on the lower surface side of the floor panel; and
    the cooling piping includes an upper cooling part that is routed in a state of being sandwiched between the driving battery and the floor panel.

2. The vehicle according to claim 1, wherein:
    the cooling piping includes a lower cooling part that is routed along a lower surface of the driving battery; and
    the cooling piping is provided with a switching valve capable of switching the flow passage between a state where the refrigerant flows to both the upper cooling part and the lower cooling part and a state where the refrigerant flows to only one of the upper cooling part and the lower cooling part.

3. The vehicle according to claim 2, wherein the switching valve is configured to be capable of switching the flow passage to a state where the refrigerant flows to neither of the upper cooling part and the lower cooling part.

4. A vehicle, comprising:
    a vehicle main body including an electrical device that generates heat when the vehicle travels;
    a heat exchanger that performs heat exchange between outside air and a refrigerant;
    cooling piping that constitutes a flow passage through which the refrigerant circulates between the electrical device and the heat exchanger, with a part of the flow passage being routed on a lower surface side of and in contact with a floor panel that constitutes a part of the vehicle main body;
    a vehicle seat provided inside a vehicle cabin;
    a seat occupancy sensor that detects that a passenger sits in the vehicle seat; and
    an on-off valve provided on the cooling piping and controlled by a control unit, wherein:
    the cooling piping is routed at least under the vehicle seat; and the control unit opens or closes the on-off valve to stop a flow of a refrigerant flowing through a part of the cooling piping that is located under the vehicle seat in which the seat occupancy sensor has detected that a passenger is sitting.

\* \* \* \* \*